US 8,214,428 B1

(12) United States Patent
Christiaens (10) Patent No.: US 8,214,428 B1
(45) Date of Patent: Jul. 3, 2012

(54) OPTIMIZED PREPOPULATION OF A CLIENT SIDE CACHE IN A DEDUPLICATION ENVIRONMENT

(75) Inventor: Mark Christiaens, Aalter (BE)

(73) Assignee: Symantec Corporation, Mountain View, CA (US)

( * ) Notice: Subject to any disclaimer, the term of this patent is extended or adjusted under 35 U.S.C. 154(b) by 174 days.

(21) Appl. No.: 12/782,648

(22) Filed: May 18, 2010

(51) Int. Cl.
*G06F 15/16* (2006.01)
(52) U.S. Cl. ........ 709/203; 709/202; 709/216; 709/219; 709/226; 709/248; 707/610; 707/633; 707/640; 707/649; 711/162; 726/2
(58) Field of Classification Search .................. 709/202, 709/203, 216, 219, 226, 248; 707/610, 633, 707/640, 649, 654; 711/162
See application file for complete search history.

(56) References Cited

U.S. PATENT DOCUMENTS

| | | | |
|---|---|---|---|
| 6,041,411 A * | 3/2000 | Wyatt ............................... | 726/29 |
| 7,055,008 B2 * | 5/2006 | Niles et al. ...................... | 711/162 |
| 7,124,305 B2 * | 10/2006 | Margolus et al. .............. | 713/193 |
| 7,797,750 B2 * | 9/2010 | Ho et al. .......................... | 726/26 |
| 2003/0236993 A1 * | 12/2003 | McCreight et al. ............ | 713/200 |
| 2010/0088296 A1 * | 4/2010 | Periyagaram et al. ........ | 707/705 |
| 2010/0174881 A1 * | 7/2010 | Anglin et al. .................. | 711/162 |
| 2010/0250858 A1 * | 9/2010 | Cremelie et al. .............. | 711/136 |
| 2010/0312752 A1 * | 12/2010 | Zeis et al. ...................... | 707/640 |
| 2011/0093920 A1 * | 4/2011 | Etchegoyen ....................... | 726/3 |
| 2011/0099200 A1 * | 4/2011 | Blount et al. .................. | 707/770 |
| 2011/0113115 A1 * | 5/2011 | Chang et al. .................. | 709/213 |
| 2011/0167221 A1 * | 7/2011 | Pangal et al. .................. | 711/117 |

* cited by examiner

*Primary Examiner* — Michael Won
(74) *Attorney, Agent, or Firm* — Brill Law Office; Jeffrey Brill (57) ABSTRACT

A backup cache on a client is prepopulated with fingerprints corresponding to data stored on a backup server. A plurality of fingerprints of data are received from the client, each received fingerprint corresponding to data present on the client which is subject to backup to the server. For each received fingerprint, an attempt is made to locate data corresponding to the received fingerprint stored on the backup server. Responsive to locating data corresponding to a received fingerprint stored on the backup server, data stored on the backup server considered to be "in the neighborhood" of the located data is identified. Fingerprints (e.g., hashes) identifying data stored on the backup server in the neighborhood of the located data are created and transmitted to the client, for prepopulating the backup cache on the client.

20 Claims, 5 Drawing Sheets

OPTIMIZED PREPOPULATION OF A CLIENT SIDE CACHE IN A DEDUPLICATION ENVIRONMENT

TECHNICAL FIELD

This disclosure pertains generally to the backup of computer data, and more specifically to prepopulating a client side cache in a deduplication backup environment.

BACKGROUND

Data deduplication is a form of optimized data storage, in which redundant data is eliminated. Deduplication is frequently used in the backup of computer data. It is common that multiple computers in a single enterprise (or even a single computer) contain multiple copies of the same data. It improves efficiency in backup scenarios to store only a single backup copy of the data. In the deduplication process, only one copy of the data is stored on the backup server, and each client side copy of the data is indexed to this single backup copy. Thus, should any client side copy of the data need to be restored, it can be restored from the single backup copy. Deduplication is able to reduce the required storage capacity since only unique data is stored on the backup server.

When a client computer is backed up, it is useful to have a local, client side cache to speed up the backup process. This cache contains the fingerprints (hashes) of data that is known to be currently stored on the backup server. When specific files stored on a client are to be backed up, the cache can be checked to determine whether this data is already present on the backup server. This way, the client can determine locally whether or not these files need to be transmitted to the backup server. If the cache indicates that the data is already stored on the backup server, then the client can avoid sending the actual files, and instead send only a request to the backup server to retain the pre-existing data. Thus, the use of a client side cache can save the resource and time intensive transmission of data to the backup server, where the data is already present thereon.

Such a client side cache is only as helpful as the quantity and quality of its contents. In other words, where a client side cache contains a hash of data that is both on the client and the backup server, the use of the cache saves the need to transmit that data to the server. However, the cache is not helpful in the case where data is present on the client and server but no corresponding hash is present in the cache. In this scenario, although the transmission of the data to the backup server is superfluous, the client has no indication that the data is already present on the server. Additionally, hashes in the cache pertaining to data that is in fact on the server but not present on the client are also not helpful, as the client has no need to backup such data in the first place.

A client side cache can be built over time, by caching hashes of data backed up from the client to the server, after the transmission and server side storage of the data has been completed. However, where a new client is to be backed up, this new client will not have a cache yet. Also, in certain situations, the contents of an existing cache will need to be invalidated and rebuilt from scratch, because, for example, the cache has become out of synchronization with the content on the backup server.

It would be desirable to address these issues.

SUMMARY

A backup cache on a client is prepopulated with fingerprints corresponding to data stored on a backup server. On the backup server side, a plurality of fingerprints of data are received from the client, each received fingerprint corresponding to data present on the client which is subject to backup to the server. For each received fingerprint, an attempt is made to locate data corresponding to the received fingerprint stored on the backup server. Responsive to locating data corresponding to a received fingerprint stored on the backup server, data stored on the backup server considered to be "in the neighborhood" of the located data is identified. Such identification can comprise identifying a storage unit on the backup server in which the located data is stored, and classifying all data stored in the storage unit as being in the neighborhood of the located data. In some embodiments, such a classification is made only where data corresponding to a plurality of received fingerprints is stored in the same storage unit on the server. Such a storage unit can be in the form of, e.g., a container file. In other embodiments, data in the neighborhood of the located data can be identified other ways, for example by identifying data stored on the backup server likely within a given degree of precision to be stored also on the client, based on data corresponding to at least one received fingerprint being stored on the client. Fingerprints (e.g., hashes) identifying data stored on the backup server in the neighborhood of the located data are created and transmitted to the client, for prepopulating the backup cache on the client. Where data corresponding to a received fingerprint is located on the backup server, an indication (e.g., the fingerprint itself) can be transmitted to the client for prepopulating the backup cache.

On the client side, a limited sample of data present on the client and subject to backup to the server is selected. Fingerprints (e.g., hashes) corresponding to the selected data present on the client are created. The created fingerprints are transmitted to the backup server, for identifying data present on the backup server in the neighborhood of the selected data. In response to transmitting the created fingerprints to the backup server, fingerprints of data stored on the backup server in the neighborhood of the selected data are received therefrom. The client backup cache is prepopulated with the received fingerprints. Additionally, in response to transmitting a created fingerprint to the backup server, an indication that the data corresponding to the created fingerprint is stored on the backup server can be received, in which case the backup cache is also prepopulated with the created fingerprint.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
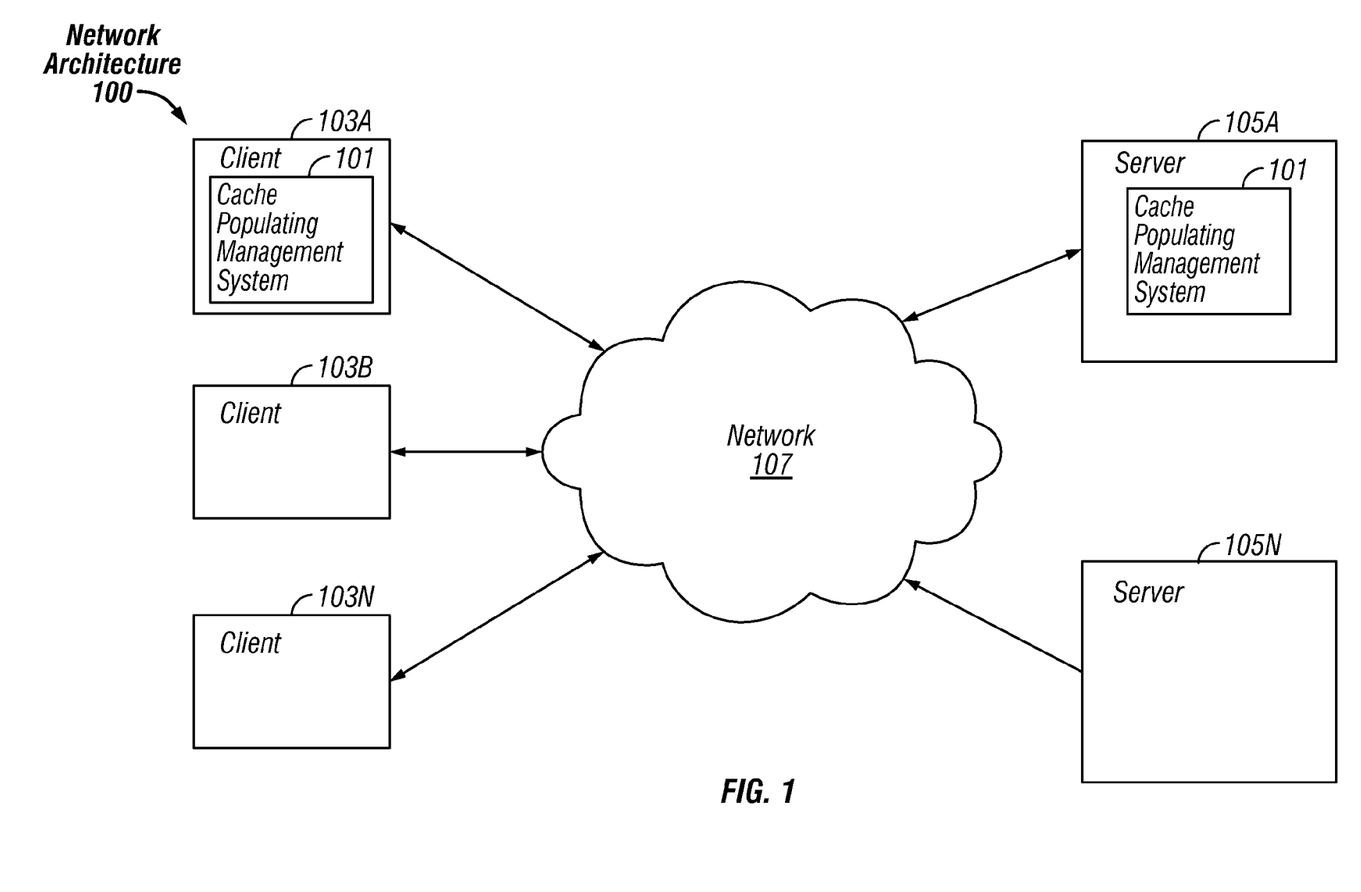
FIG. 1 is a block diagram of an exemplary network architecture in which a cache populating management system can be implemented, according to some embodiments.

FIG. 1 is a block diagram illustrating an exemplary network architecture 100 in which a cache populating management system 101 can be implemented. The illustrated network architecture 100 comprises multiple clients 103A, 103B and 103N, as well as multiple servers 105A and 105N. In FIG. 1, the cache populating management system 101 is illustrated as residing on client 103A and server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
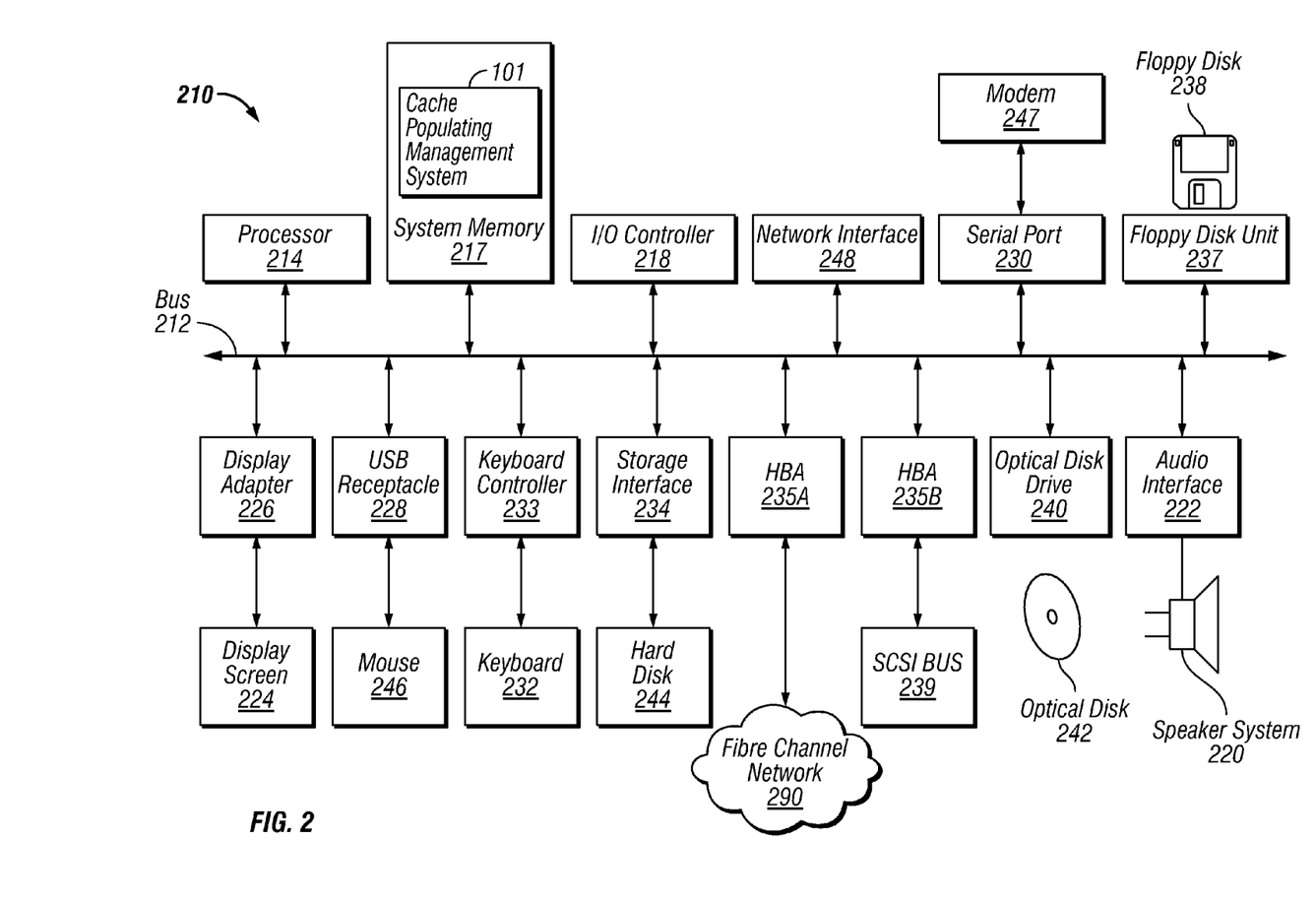
FIG. 2 is a block diagram of a computer system suitable for implementing a cache populating management system, according to some embodiments.

FIG. 2 is a block diagram of a computer system 210 suitable for implementing a cache populating management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the cache populating management system 101 is illustrated as residing in system memory 217. The workings of the cache populating management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
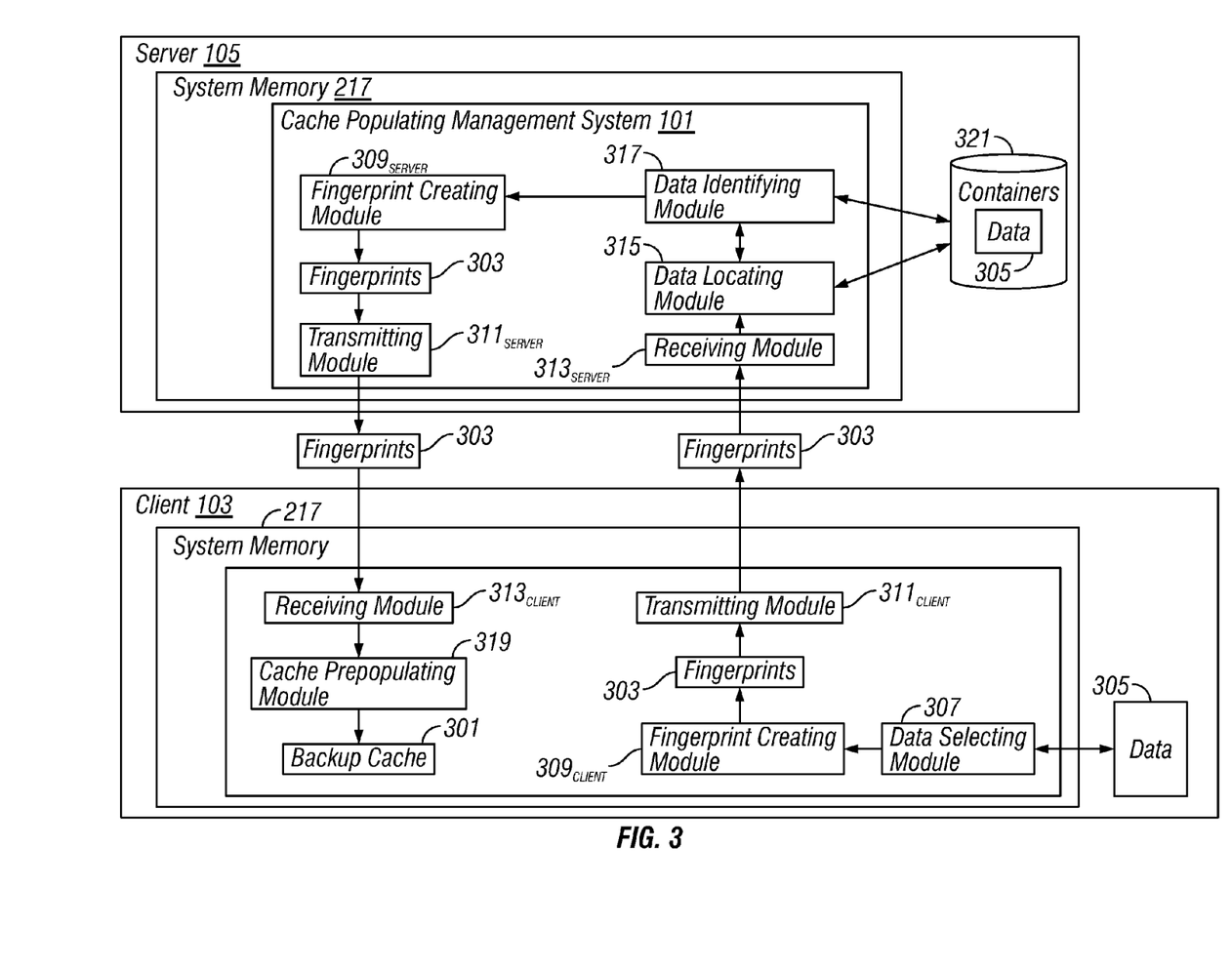
FIG. 3 is a block diagram of the operation of a cache populating management system, according to some embodiments.

FIG. 3 illustrates the operation of a cache populating management system 101 with components residing in the system memory 217 of a client computer 103, and components residing in the system memory 217 of a server computer 105, according to some embodiments. As described above, the functionalities of the cache populating management system 101 can reside on a client 103, a server 105, or be distributed between multiple computer systems 210, including within a cloud-based computing environment in which the functionality of the cache populating management system 101 is provided as a service over a network 107. It is to be understood that although the cache populating management system 101 is illustrated in FIG. 3 as a single entity, the illustrated cache populating management system 101 represents a collection of functionalities, which can be instantiated as a single or multiple modules as desired (an instantiation of specific, multiple modules of the cache populating management system 101 is illustrated in FIG. 3). It is to be understood that the modules of the cache populating management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the cache populating management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a cache populating management system 101 operates in the context of a client 103 subject to periodic data backup to a backup server 105. The cache populating management system 101 prepopulates a backup cache 301 on the client 103 with fingerprints 303 (e.g., hashes) corresponding to a relevant subset of data 305 already present on the server 105. As used herein "prepopulate the backup cache" means to place fingerprints 303 of data 305 in the backup cache 301 prior to use. (This need not be prior to an initial use of the backup cache 301). For example, this technique can be applied to a new client 103 on which a backup cache 301 has not yet been populated, or in a situation in which an existing client side backup cache 301 has been invalidated and must be repopulated.

When the cache 301 on a client 103 is to be prepopulated, a data selecting module 307 of the cache populating management system 101 selects a limited sample of the data 305 on the client 103 to be backed up. How much and which client side data 305 to select are variable design parameters. A client side fingerprint creating module $309_{CLIENT}$ of the cache populating management system 101 creates fingerprints 303 identifying this data 305. It is to be understood that these fingerprints 303 can be in the form of hashes, created by, e.g., using any conventional hashing algorithm. The fingerprint creating module 309 can create fingerprints 303 of both files comprising the sample data 305 and/or individual segments of those files. A client side transmitting module $311_{CLIENT}$ of the cache populating management system 101 transmits the fingerprints 303 of the sample data 305 to the server 105.

A server side receiving module $313_{SERVER}$ of the cache populating management system 101 receives the fingerprints 303 transmitted from the client 103. For each received fingerprint 303, a data locating module 315 of the cache populating management system 101 attempts to locate the corresponding data 305 within the backup data 305 stored on the server 105. In other words, the data locating module 315 determines whether the data 305 corresponding to the fingerprint 303 received from the client 103 has already been backed up to the server 105 (e.g., from another client 103). Where data 305 corresponding to a received fingerprint 303 is located on the server 105, a data identifying module 317 of the cache populating management system 101 identifies data 305 on the server considered to be "in the neighborhood" of the data 305 corresponding to the received fingerprint 303. Criteria for identifying data 305 considered to be "in the neighborhood" of other data 305 are described in detail below.

A server side fingerprint creating module $309_{SERVER}$ of the cache populating management system 101 creates fingerprints 303 identifying the identified data 305. (Typically, during this process the identified data 305 is marked as being in use to avoid it being reclaimed.) A server side transmitting module $311_{SERVER}$ of the cache populating management system 101 transmits the fingerprints 303 of the identified data 305 to the client 103, where they are received by a client side receiving module $313_{CLIENT}$. A cache prepopulating module 319 of the cache populating management system 101 prepopulates the client's backup cache 301 with these fingerprints 303 received from the server 105, as well as the fingerprints 303 of the client side data 305 found to be on the server 105. Thus, the backup cache 301 is populated with 1) the fingerprints 303 of the client side data 305 transmitted to the server 105 and found to reside thereon, and 2) the fingerprints 303 of the identified server side data 305 in the neighborhood of that client side data 305.

As used herein, the language data 305 "considered to be in the neighborhood" of other data 305 means data 305 on a server 105 determined to be likely to be present on a client 103, based on the fact that specific data 305 is known to be on the client 103. More specifically, when a fingerprint 303 corresponding to data 305 on the client 103 is received, based on the fact that this specific data 305 is known to be on the client 103, the data identifying module 317 can identify data 305 on the server 105 that is also likely to be on the client 103. The server side data 305 that is identified as being likely to be on the client 103 based on the data 305 known to be on the client 103 is considered to be "in the neighborhood" of the known client side data 305. The above described backup cache 301 prepopulating functionality leverages the identification of such data 305 on the server 105 that is "in the neighborhood" of the data 305 known to be on the client 103. By prepopulating the client side backup cache 301 with fingerprints 303 not just of the sample data 305 from the client 103 actually found to reside on the server 105, but also with additional identified data 305 on the server 105 likely to reside on the client 103, the erstwhile empty backup cache 301 becomes well stocked with fingerprints 303 corresponding to client side data 305, and thus the backup process is made more efficient.

Note that all the fingerprints 303 returned from the server 105 to the client 103 correspond to data 305 actually on the server 103. Thus, the client side backup cache 301 is never prepopulated with a fingerprint 303 corresponding to data 305 not on the server 105. However, if the accuracy rate of identifying data 305 likely to be on the client 103 is less than 100 percent, the backup cache 301 can be populated with one or more fingerprints 303 corresponding to data 305 not actually present on the client 103, in addition to the fingerprints 303 of data 305 located thereon. Thus, the greater the accuracy of the identification of the "in the neighborhood" data 305 on the server 105, the more efficient the backup process becomes.

The specific criteria for identifying data 305 within a neighborhood varies between embodiments, depending upon the backup architecture and/or format used for storing backup data 305 on the server 105. Some backup systems store data 305 in pre-allocated units of storage space (e.g., files) of a given size (e.g., 128 megabytes, 256 megabytes, 512 megabytes, etc.). Such pre-allocated units of storage space are referred to herein as "container files" 321, but it is to be understood that other names can be used to describe such storage units. In backup systems that use this type of functionality, the raw backup data 305 is stored in container files 321 on the server 105. Such backup systems typically attempt to store the backup data 305 originating from the same client 103 in the same container file(s) 321. This is important in ensuring that restore speed is adequate, because if the backup system were to assemble restore data from many (e.g., hundreds) of different container files 321, then the restore speed would drop significantly. Thus, backup systems typically consolidate backup data 305 from a single client 103 in as few container files 321 as is practicable.

In this context, the data identifying module 317 can identify data 305 as being "in the neighborhood" of the data 305 corresponding to a given fingerprint 303 as follows. First, the data identifying module 317 determines in which container file 321 data 305 corresponding to the fingerprint 303 is stored, if any. The data identifying module 317 can use conventional backup server functionality to make this determination, for example by reading the backup system index (not illustrated). If data 305 corresponding to a given fingerprint 303 is not located on the server 105, than that fingerprint 303 is not returned to the client 103 for caching, nor is an attempt made to identify data 305 in its neighborhood. On the other hand, if the data 303 corresponding to the fingerprint 303 is located in a container file 321 on the server 105, the data identifying module 317 can iterate through the entire container file 321, and identify all of the data 305 stored therein as being "in the neighborhood." By performing this procedure for every fingerprint 303 provided by the client 103, a set of data 305 likely to be on the client 103 can be identified, and the corresponding fingerprints 303 can be used to prepopulate the client side backup cache 301, as described above.

In some embodiments, data 305 in a container file 321 is only classified as being in the neighborhood of data 305 known to be on a client 103 where more rigorous conditions are met. For example, in some embodiments the data 305 in a given container file 321 is only considered to be in the neighborhood where a given number N of the fingerprints 303 received from the client 103 are found in the container 321. The embodiment above describes this scenario where N equals 1, but in other embodiment N can be set to a higher number as desired (e.g., 2, 5, 8). In other words, in such embodiments, only in response to the client 103 providing at least N fingerprints 303 of data 305 located in a given container file 321 is the totality of the data 305 in that container file 321 considered to be in the neighborhood. It is to be understood that what value to use for N is a variable design parameter which can be informed by factors such as available bandwidth or client 103 size.

It is to be understood further that in different embodiments, other techniques can be used to determine what data 305 on the server 105 is "in the neighborhood" (i.e., likely to be present on the client 103) based on one or more fingerprints 303 received from the client, within a given degree of precision. For example, in some backup systems, stored data 105 from the same client 103 can be grouped in ways other than common pre-allocated units of storage space, and various corresponding indications of common origin can be used to identify data 305 likely to be on a given client 103, based on one or more fingerprints 303 of data 305 known to be on that client 103.

Note that prepopulating the client side backup cache 301 is particularly relevant in the context of asymmetric bandwidth between client 103 and server 105, which is common. It is often the case for remote systems that the available upload bandwidth is substantially lower than the available download bandwidth. Thus, minimizing the requests from client 103 to server 105 greatly increases communication efficiency. The use of the cache populating management system 101 as described above has this effect, as the client 103 sends a limited sample of fingerprints 303 to the server 105, and in response receives a larger, useful set of fingerprints 303 that it can use to avoid a significant amount of further communication with the server 105.

Figure 4:
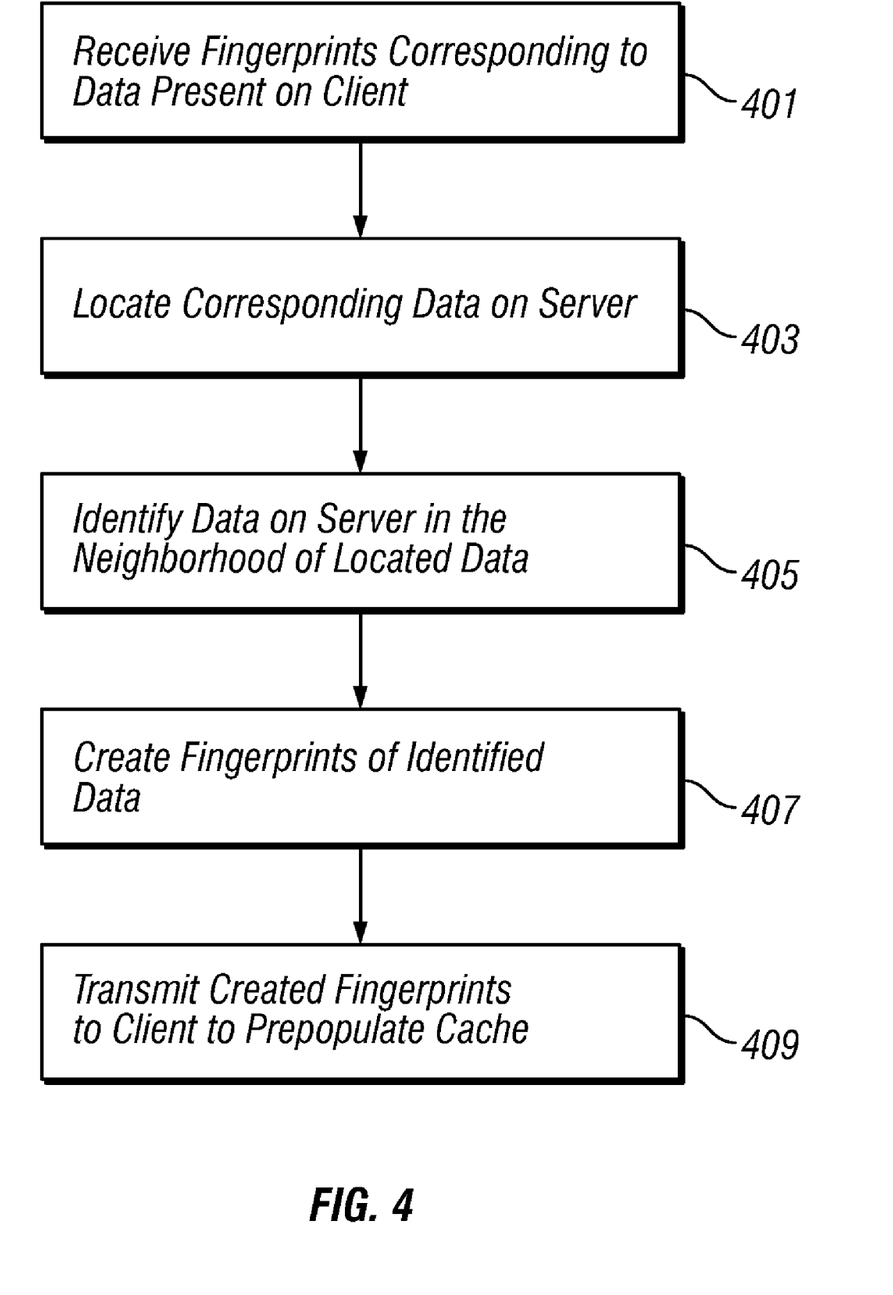
FIG. 4 is a flowchart of the server side operation of a cache populating management system, according to some embodiments.

FIG. 4 illustrates server side operation of the cache populating management system 101 (FIG. 1), according to some embodiments. A server side receiving module $313_{SERVER}$ (FIG. 3) of the cache populating management system 101 (FIG. 1) receives 401 a plurality of fingerprints 303 (FIG. 3) corresponding to data 305 (FIG. 3) present on the client 103 (FIG. 1) which is subject to backup to the server 105 (FIG. 1). For each received fingerprint 303 (FIG. 3), a data locating module 315 (FIG. 3) of the cache populating management system 101 (FIG. 1) attempts to locate 403 data 305 (FIG. 3) corresponding to the received fingerprint 303 (FIG. 3) stored on the server 105 (FIG. 1). Responsive to locating data 305 (FIG. 3) corresponding to a received fingerprint 303 (FIG. 3) stored on the server 105 (FIG. 1), a data identifying module 317 (FIG. 3) of the cache populating management system 101 (FIG. 1) identifies 405 data 305 (FIG. 3) stored on the server 105 (FIG. 1) considered to be "in the neighborhood" of the located data 305 (FIG. 3). A server side fingerprint creating module $309_{SERVER}$ (FIG. 3) of the cache populating management system 101 (FIG. 1) creates 407 fingerprints 303 (FIG. 3) identifying data 305 (FIG. 3) stored on the server 105 (FIG. 1) in the neighborhood of the located data 305 (FIG. 3). A server side transmitting module $311_{SERVER}$ (FIG. 3) of the cache populating management system 101 (FIG. 1) transmits 409 the created fingerprints 303 (FIG. 3) to the client 103 (FIG. 1), for prepopulating the backup cache 301 (FIG. 3).

Figure 5:
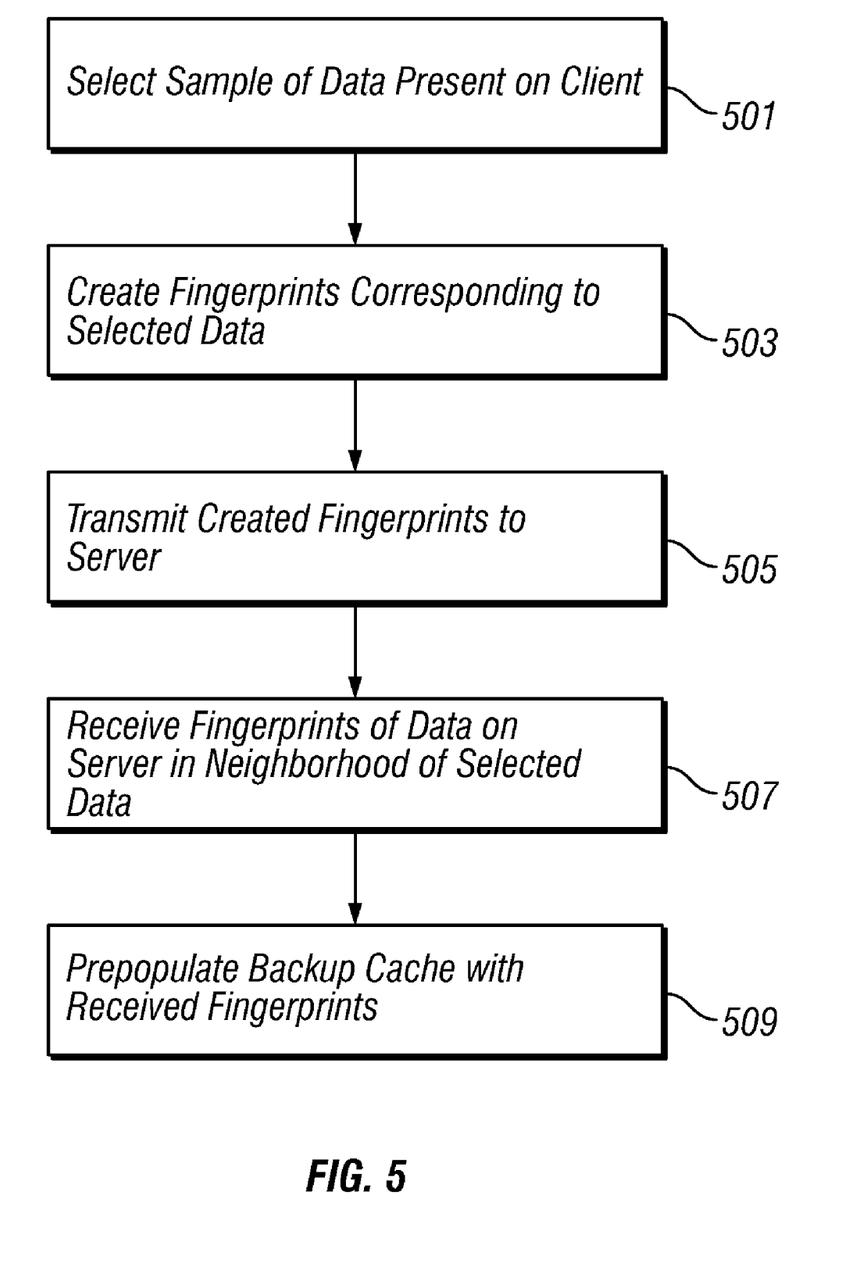
FIG. 5 is a flowchart of the client side operation of a cache populating management system, according to some embodiments.

FIG. 5 illustrates client side operation of the cache populating management system 101 (FIG. 1), according to some embodiments. A data selecting module 307 (FIG. 3) of the cache populating management system 101 (FIG. 1) selects 501 a limited sample of data 305 (FIG. 3) present on the client 103 (FIG. 1) and subject to backup to the server 105 (FIG. 1). A client side fingerprint creating module $309_{CLIENT}$ (FIG. 3) of the cache populating management system 101 (FIG. 1) creates 503 fingerprints 303 (FIG. 3) corresponding to the selected data 305 (FIG. 3). A client side transmitting module $311_{CLIENT}$ (FIG. 3) of the cache populating management system 101 (FIG. 1) transmits 505 the created fingerprints 303 (FIG. 3) to the server 105 (FIG. 1), for identifying data 305 (FIG. 3) present on the server 105 (FIG. 1) in the neighborhood of the selected data 305 (FIG. 3). In response to transmitting the created fingerprints 303 (FIG. 3) to the server 105 (FIG. 1), a client side receiving module $313_{SERVER}$ (FIG. 3) of the cache populating management system 101 (FIG. 1) receives 507 fingerprints 303 (FIG. 3) of data 305 (FIG. 3) stored on the server 105 (FIG. 1) in the neighborhood of the selected data 305 (FIG. 3). A cache prepopulating module 319 (FIG. 3) of the cache populating management system 101 (FIG. 1) prepopulates 509 the backup cache 301 (FIG. 3) with the received fingerprints 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for prepopulating a backup cache on a client with fingerprints corresponding to data stored on a server for backups in a deduplication environment, the method comprising the steps of:

receiving a plurality of first fingerprint data at the server from the client, each of the first fingerprints generated from data present on the client subject to backup on the server;

locating neighboring server data corresponding to each of the first fingerprints and stored on the server, the neighboring server data comprising server data having a predetermined relationship to the client data used to generate the first fingerprints;

generating a plurality of second fingerprints corresponding to the neighboring server data on the server; and transmitting the plurality of second fingerprints to the client, for prepopulating the backup cache on the client with the plurality of second fingerprints which are indicative of the neighboring server data.

2. The method of claim 1 wherein locating neighborhood server data further comprises:

identifying a storage unit on the server storing data; and classifying all data stored in the storage unit as being in the neighborhood of the located data.

3. The method of claim 2 wherein the storage unit further comprises:

a container file.

4. The method of claim 1 wherein locating neighboring server data further comprises:

identifying a storage unit on the server storing data corresponding to at least one of the plurality of first fingerprints; and classifying all data stored in the storage unit as neighboring server data.

5. The method of claim 1 wherein identifying data in the neighborhood of the located data further comprises:

identifying data stored on the server within a predetermined tolerance to be stored also on the client, based on at least one of the first fingerprints.

6. The method of claim 1 wherein generating the plurality of second fingerprints further comprises:

creating a hash of identified data stored on the server that is in the neighborhood of the located data.

7. The method of claim 1 further comprising:

responsive to locating data corresponding to at least one of the fingerprints stored on the server, transmitting the corresponding second fingerprint to the client, for prepopulating the backup cache on the client.

8. A computer implemented method for prepopulating a backup cache on a client with fingerprints corresponding to data stored on a backup server in a deduplication environment, the method comprising the steps of:

selecting a limited sample of data present on the client, said data present on the client being subject to backup to the server;

generating a plurality of first fingerprints corresponding to the selected data present on the client;

transmitting the plurality of first fingerprints to the server, for locating neighboring server data present on the server, the neighboring server data comprising server data having a predetermined relationship to the client data used to generate the first fingerprints;

in response to transmitting the plurality of first fingerprints to the backup server, receiving, from the server, a plurality of second fingerprints generated by the server and corresponding to the neighboring server data stored on the server; and prepopulating the client backup cache with the plurality of second fingerprints which are indicative of the neighboring server data.

9. The method of claim 8 wherein creating a fingerprint corresponding to selected data present on the client further comprises:

creating a hash of selected data present on the client.

10. The method of claim 8 further comprising:

in response to transmitting the plurality of first fingerprints to the server, receiving, from the server, an indication that data corresponding to the plurality of first fingerprints is stored on the server; and prepopulating the backup cache on the client with the plurality of second fingerprints.

11. At least one non-transitory computer readable storage medium storing a computer program product for prepopulating a backup cache on a client with fingerprints corresponding to data stored on a backup server in a deduplication environment, the computer program product comprising:

program code for receiving a plurality of first fingerprint data at the server from the client, each of the first fingerprints generated from data present on the client subject to backup on the server;

locating neighboring server data corresponding to each of the first fingerprints and stored on the server, the neighboring server data comprising server data having a predetermined relationship to the client data used to generate the first fingerprints;

generating a plurality of second fingerprints corresponding to the neighboring server data on the server; and program code for transmitting the plurality of second fingerprints to the client, for prepopulating the backup cache on the client with the plurality of second fingerprints which are indicative of the neighboring server data.

12. The computer program product of claim 11 wherein the program code for locating neighborhood server data further comprises:

program code for identifying a storage unit on the server storing data; and program code for classifying all data stored in the storage unit as being in the neighborhood of the located data.

13. The computer program product of claim 12 wherein the storage unit further comprises:

a container file.

14. The computer program product of claim 11 wherein the program code for locating neighboring server data further comprises:

program code for identifying a storage unit on the server storing data corresponding to at least one of the plurality of first fingerprints; and program code for classifying all data stored in the storage unit as neighboring server data.

15. The computer program product of claim 11 wherein the program code for identifying data in the neighborhood of the located data further comprises:

program code for identifying data stored on the server within a predetermined tolerance to be stored also on the client, based on at least one of the first fingerprints.

16. The computer program product of claim 11 wherein the program code for generating the plurality of second fingerprints further comprises:

program code for creating a hash of identified data stored on the server that is in the neighborhood of the located data.

17. The computer program product of claim 11 further comprising:

program code for, responsive to locating data corresponding to at least one of the fingerprints stored on the server, transmitting the corresponding second fingerprint to the client, for prepopulating the backup cache on the client.

18. The computer program product of claim 11 further comprising:
- program code for selecting a limited sample of data present on the client, said data present on the client being subject to backup to the server;
- generating a plurality of first fingerprints corresponding to the selected data present on the client;
- program code for transmitting the plurality of first fingerprints to the server, for locating neighboring server data present on the server, the neighboring server data comprising server data having a predetermined relationship to the client data used to generate the first fingerprints;
- program code for, in response to transmitting the plurality of first fingerprints to the backup server, receiving, from the server, a plurality of second fingerprints generated by the server and corresponding to the neighboring server data stored on the server; and
- program code for prepopulating the client backup cache with the plurality of second fingerprints which are indicative of the neighboring server data.

19. The computer program product of claim 18 wherein the program code for creating a fingerprint corresponding to selected data present on the client further comprises:
- program code for creating a hash of selected data present on the client.

20. The computer program product of claim 18 further comprising:
- program code for, in response to transmitting the plurality of first fingerprints to the server, receiving, from the server, an indication that data corresponding to the plurality of first fingerprints is stored on the server; and
- program code for prepopulating the backup cache on the client with the plurality of second fingerprints.

* * * * *